United States Patent [19]

Samberg

[11] Patent Number: 5,178,098
[45] Date of Patent: Jan. 12, 1993

[54] DOG GROOMING STAND

[76] Inventor: Charles M. Samberg, 3 Paula La., New City, N.Y. 10956

[21] Appl. No.: 890,113
[22] Filed: May 29, 1992
[51] Int. Cl.$^5$ ..................... A01K 13/00; A01K 27/00
[52] U.S. Cl. ..................... 119/103; 119/83; 119/109; 119/122
[58] Field of Search .............. 119/102, 106, 109, 122, 119/123, 96, 83, 85, 147.1; 128/869, 870, 876, 883

[56] References Cited

U.S. PATENT DOCUMENTS

| | | | |
|---|---|---|---|
| 3,023,734 | 3/1963 | Schaub | 119/103 |
| 3,484,096 | 12/1969 | Briggs | 119/103 |
| 3,524,434 | 8/1970 | Finley | 119/103 |
| 3,744,457 | 7/1973 | Heine et al. | 119/103 |
| 3,765,375 | 10/1973 | Young | 119/96 |
| 4,261,296 | 4/1981 | Rosenberg | 119/103 |
| 4,834,020 | 5/1989 | Meyer | 119/96 |

FOREIGN PATENT DOCUMENTS 9003728 4/1990 World Int. Prop. O. .......... 119/109

Primary Examiner—John G. Weiss
Attorney, Agent, or Firm—Wegner, Cantor, Mueller & Player

[57] ABSTRACT

A dog grooming stand includes two vertically adjustable rods mounted opposite each other on a grooming table. Each rod is provided with a pair of eye-hooks extending inwardly and spaced apart by a predetermined vertical distance. A collar adapted to fit about the dog's neck is provided with four attachment members disposed at angular intervals about the collar. The collar is suspended between the two vertical rods by four straps attached to and extending from each of the eye-hooks to a corresponding one of the four attachment members.

4 Claims, 2 Drawing Sheets

DOG GROOMING STAND

BACKGROUND OF THE INVENTION

The invention relates to a stand for holding an animal in place on a grooming table during grooming.

A conventional grooming stand such as that shown in FIG. 1 is known wherein an L-shaped rod 1 is mounted on a grooming table 3 via a clamp 5 so that the short portion 7 of the L-shaped rod extends horizontally over the table. The distance of the short portion from the top surface of the grooming table can be adjusted by moving the long portion 9 of the L-shaped rod through the clamp. The clamp is secured to the table by a thumbscrew 5A and the long portion 9 is secured thereto by a thumbscrew 5B.

In the conventional stand of FIG. 1 the short portion 7 is provided with an eye-hook 11, and a collar 13 is suspended from the eye-hook by a strap 15 connected therebetween. By adjustment of the height of the stand and the size of the collar, animals of different sizes may easily be accommodated.

This conventional apparatus has a disadvantage, however, that a large degree of movement of the animal is allowed even when the apparatus is in use. Depending upon the length of the strap, a significant amount of side-to-side and front-to-back movement of the animal is possible. Also, the animal is free to rotate about the axis of the strap and to pivot its head from side to side. Movement of the animal is clearly undesirable during grooming and may present a danger if the animal has a tendency to bite.

Restraints are known in the prior art which prevent nearly all movement of a animal on a table. Examples of such prior art devices are disclosed in U.S. Pat. No. 2,804,845 to Plumley et al. and U.S. Pat. No. 4,003,341 to La Croix. However, these devices are complicated, expensive, and either cannot or do not easily adjust to different animal sizes. Moreover, these prior art devices contact the animal in several places and over a large area so that complete grooming of the animal is made difficult or impossible.

SUMMARY OF THE INVENTION

The apparatus disclosed herein overcomes the above-described disadvantages of the prior art and provides a grooming stand which is economical, simple to use, and easily adjustable to different animal sizes. The device of this invention further provides excellent restraint of animal movement while presenting minimal obstruction to the grooming process. The device of the invention comprises:

a first vertical rod adapted to be mounted on a grooming table so as to be vertically adjustable, said first vertical rod having a pair of eye-hooks mounted thereon and spaced apart by a predetermined vertical distance;

a second vertical rod adapted to be mounted on a grooming table opposite said first vertical rod so as to be vertically adjustable, said second vertical rod having a pair of eye-hooks mounted thereon and spaced apart by the predetermined vertical distance;

a collar adapted to fit about the animal's neck, said collar comprising four attachment members disposed at angular intervals about the collar; and suspension means for suspending the collar between the first and second vertical rods, said suspension means comprising a strap attached to and extending from each said eye-hook to a corresponding one of said four attachment members.

DETAILED DESCRIPTION

Figure 1:
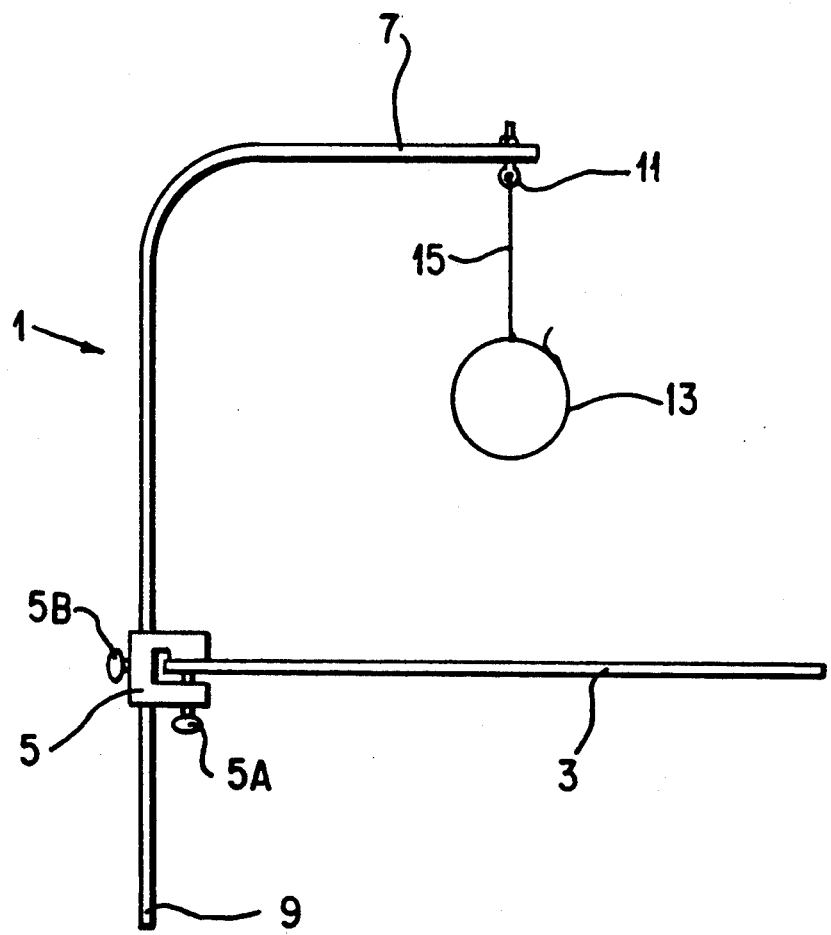
FIG. 1 is a front view of a conventional grooming stand.
Figure 2:
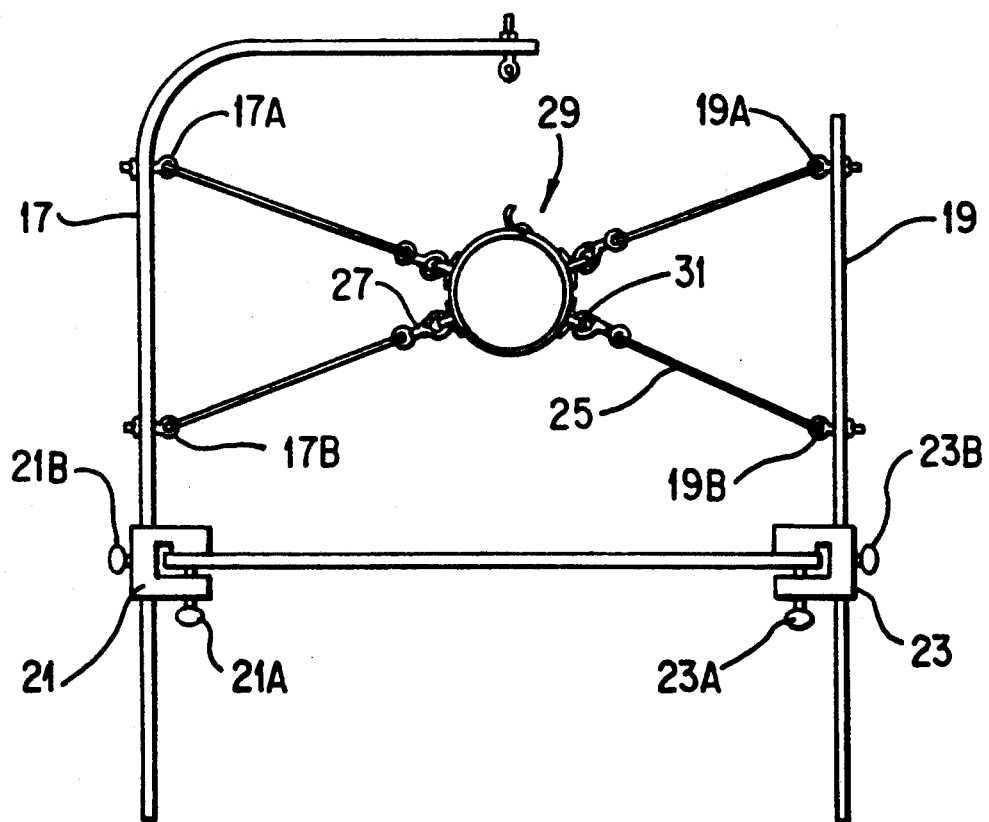
FIG. 2 is a front view according to a preferred embodiment of the present invention.

A preferred embodiment of the invention will now be described with reference to FIGS. 2–3. The preferred embodiment includes two vertical rods 17, 19 clamped to the grooming table opposite each other by means of clamps 21, 23 of a known variety. The clamps are secured to the table by thumbscrews 21A, 23A, and vertical adjustment of the two vertical rods is achieved by means of thumbscrews 21B, 23B. The long portion of an L-shaped rod such as that of prior art FIG. 1 may advantageously by used as one of vertical rods once the strap and collar have been removed therefrom. This allows a groomer who already possesses the L-shaped rod of a prior art device to modify it in accordance with the present invention and then easily switch between the loose restraint of the prior art and the tighter restraint of the invention. When an L-shaped rod is used in the present invention, the short portion serves no function.

Each of the vertical rods 17, 19 is provided with two eyehooks 17A-B, 19A-B extending inwardly and spaced vertically apart from each other. A strap 25 is connected to each of the four eyehooks at one end and is provided with a quick-release clasp 27 such as that normally found on the end of a dog leash. When an animal is to be restrained by the apparatus, a collar 29 having four D-hooks 31 provided thereon is fit to the animal and, once the animal is in position on the table, the four straps 25 are attached to the four D-hooks 31 to secure the animal in place. Because of the "X" shape of the four straps when connected to the collar, front-to-back, side-to-side, pivoting and rotational movement of the animal is prevented. At the same time, only a minimal amount of contact is made between the apparatus and the animal, so that the apparatus does not present a significant obstacle for the grooming process. Optimum restrait is obtained when the vertical spacing of the pairs of eye-hooks is relatively large with respect to the diameter of the collar.

Figure 3:
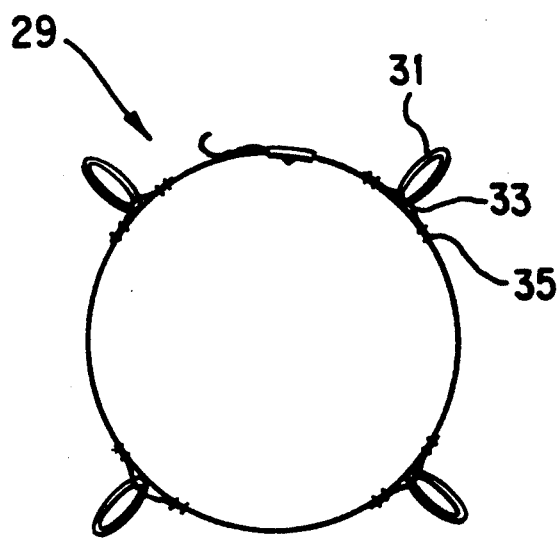
FIG. 3 is a side view of a collar according to the preferred embodiment.

A preferred embodiment of the collar 29 of the invention is shown in FIG. 3. The collar is provided with the four D-rings 31 at regular angular intervals. Each D-ring 31 is secured to the collar by a collar segment 33 which extends through the D-ring and is secured to the collar by stitching 35 at both ends of the segment. By this arrangement, a limited amount of circumferential movement of the D-rings about the collar is allowed.

While there are shown and described present embodiments of the invention, it is to be distinctly understood that the invention is not limited thereto, but may be otherwise embodied and practiced within the scope of the following claims.

What is claimed is:

1. A grooming stand for restraining an animal on a grooming table, comprising:

a first vertical rod adapted to be mounted on a grooming table so as to be vertically adjustable, said first vertical rod having a pair of eye-hooks mounted thereon and spaced apart by a predetermined vertical distance;

a second vertical rod adapted to be mounted on a grooming table opposite said first vertical rod so as to be vertically adjustable, said second vertical rod having a pair of eye-hooks mounted thereon and spaced apart by the predetermined vertical distance;

a collar adapted to fit about the animal's neck, said collar comprising four attachment members disposed at angular intervals about the collar; and suspension means for suspending the collar between the first and second vertical rods, said suspension means comprising a strap attached to and extending from each said eye-hook to a corresponding one of said four attachment members.

2. A grooming stand as claimed in claim 1, wherein each of said straps is provided with a quick-release clasp for attachment to the collar.

3. A grooming stand as claimed in claim 1, wherein the predetermined distance is greater than the diameter of the collar.

4. A grooming stand as claimed in claim 1, wherein one of said first and second vertical rods is a long portion of an L-shaped rod.

* * * * *